May 15, 1928.  1,670,114

L. N. HUTCHINSON

DRIVING BOX WEDGE

Filed Oct. 12, 1926 2 Sheets-Sheet 1

INVENTOR
Lloyd N. Hutchinson
BY
Symmestvedt & Lechner
ATTORNEYS

May 15, 1928. 1,670,114
L. N. HUTCHINSON
DRIVING BOX WEDGE
Filed Oct. 12, 1926   2 Sheets-Sheet 2

INVENTOR
Lloyd N. Hutchinson
BY
Symmestvedt & Lechner
ATTORNEYS

Patented May 15, 1928.

1,670,114

UNITED STATES PATENT OFFICE.

LLOYD N. HUTCHINSON, OF BROOKLYN, NEW YORK, ASSIGNOR TO FRANKLIN RAILWAY SUPPLY COMPANY, OF NEW YORK, N. Y., A CORPORATION OF DELAWARE.

DRIVING-BOX WEDGE.

Application filed October 12, 1926. Serial No. 141,069.

This invention relates to driving box wedges, and has, as one of its primary objects, the provision of means for cushioning abnormal shocks to, what are known in this art as, automatic adjustable wedge mechanisms.

Another object of the invention is the provision of means which will reduce, if not eliminate, breakage of certain of the wedge supporting members when subjected to such abnormal shocks.

How these and other objects and advantages, which will appear to those skilled in the art, are obtained will be clear from the following description and the accompanying drawings, which illustrate my invention in preferred form.

In the drawings:—

Figure 1:
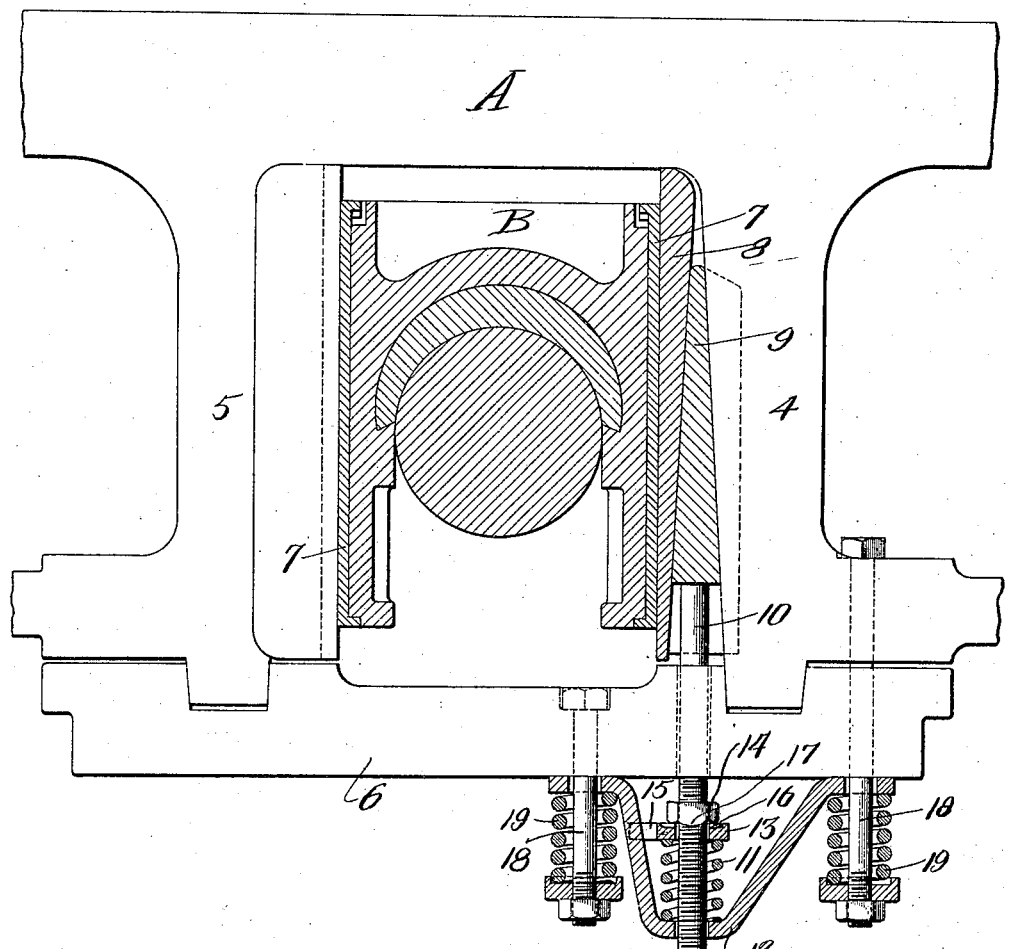
Fig. 1 is a side elevation and partial section of a driving box illustrating my improved wedge supporting means applied thereto.

Referring now to the drawings, it will be seen that I have illustrated my invention as applied to one well known type of driving box, although it is to be understood that it may be applied to any driving box embodying an adjustable wedge.

The reference letter A indicates the main frame of a locomotive with pedestal jaws 4 and 5 in which the driving box B is mounted for vertical movement. The usual pedestal binder 6 secures the box in the pedestal jaws.

Box jibs 7 are provided on the pedestal faces of the box, and interposed between the jib 7 on one side of the box and the pedestal jaw 4 are the compensating wedges 8 and 9.

The wedge 9 has a stem 10 which extends down through the pedestal binder 6. A spring 11 seated on the bracket 12 and bearing on the lock washer 13 urges the wedge 9 upwardly. Adjustment of the tension of the spring 11 may be had by screwing the nut 14 up or down on the wedge stem 10. The washer 13 has a fork connection 15 with the bracket 12, and has a recess 16 which engages a corresponding projection 17 on the nut 14, thus preventing turning of the nut under vibration incident to the operation of the locomotive.

This construction, namely, the wedge 9, with its stem or bolt 10, support 12 and spring 11, with the means of adjusting it, constitute what is now well known in the art as an "automatically adjustable wedge".

The bracket 12 is secured to the binder 6 by the bolts 18, and interposed between the bolt heads and the bracket are the spring 19 which are of sufficient strength to hold the bracket 12 against the binder during normal operation, but which will give when the wedge is forced down far enough to completely compress the spring 11. Hence, the springs 19 only come into play in instances where the normal operating spring 11 is completely compressed.

Figure 2:
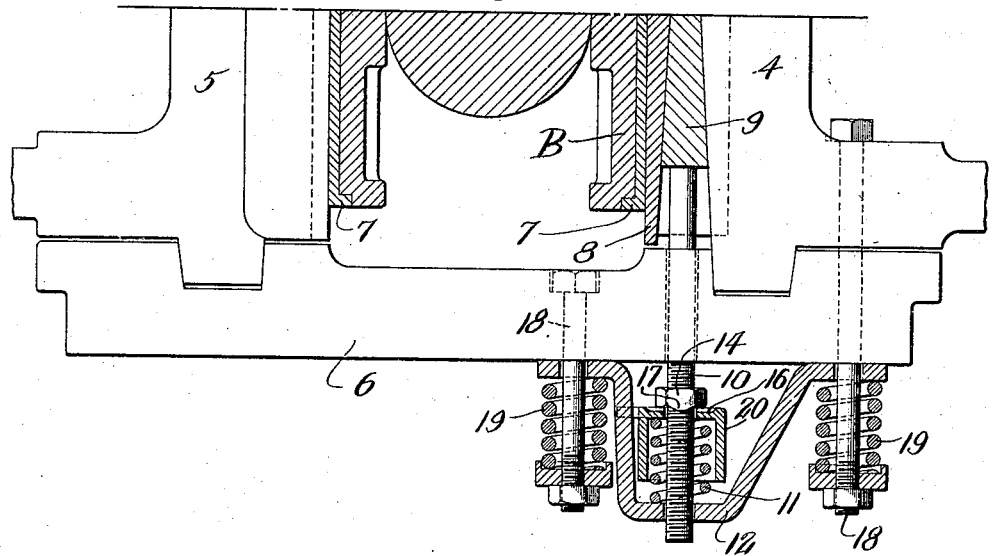
Figs. 2 and 3 are partial views similar to Fig. 1, showing modifications of the wedge supporting means.

The modification shown in Fig. 2 differs from Fig. 1 only with respect to the lock washer. In this case, the lock washer takes the form of an inverted cup 20. The operation only differs in that the springs 19 come into play when the open edge of the cup member 20 is forced down to the bracket 12.

Figure 3:
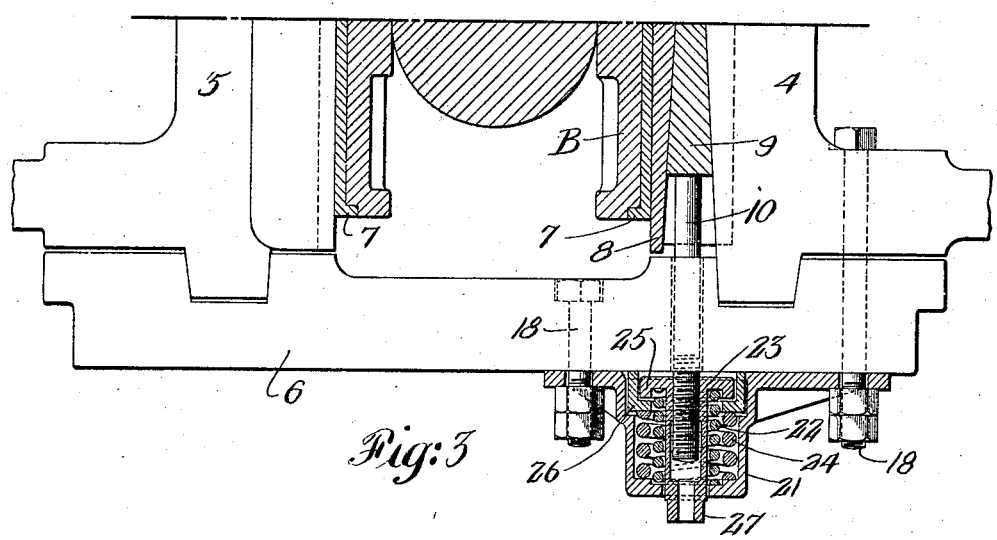

Referring to Fig. 3, the box and wedge structure is the same as shown in the figures already described. In this case, the supporting bracket has a cup-shaped portion 21 in which both the normal and auxiliary springs are housed. The normal operating spring 22 urges the wedge upwardly by the nut member 23 threaded on the wedge stem 10, and the auxiliary spring 24 comes into play only when the flange 25 on the member 23 is forced down to the flanged collar 26. The tension of the normal operating spring may be adjusted by the portion 27 of the nut member 23 which protrudes through an opening in the bottom of the cup 21, and which is configured to receive a wrench.

At times, in the operation of a locomotive, the wedges are driven downwardly with force which is substantially greater than that necessary to completely compress the normal wedge operating springs. This often results in breakage of certain parts of the wedge supporting mechanism. Such abnormal shocks are incident to several different conditions. For instance, if, during a normal downward movement of the box, there should be added the effect of a piston thrust, the wedge would be driven downwardly with great violence, due to the inclined surfaces of the compensating wedges.

I claim:—

1. A driving box wedge mechanism comprising a wedge, a supporting member, means for urging the wedge upwardly, and yielding means for absorbing excessive shocks to said member during abnormal downward movement of the wedge.

2. A driving box wedge mechanism comprising a wedge, a supporting bracket, a spring seated on said bracket and adapted to urge the wedge upwardly, together with means for absorbing excessive shocks to said bracket during abnormal downward movements of the wedge.

3. A locomotive driving box wedge mechanism comprising a wedge, and means for urging said wedge upwardly, said means being yieldingly secured to the locomotive.

4. In a driving box wedge mechanism, the combination of an automatically adjustable wedge, and means for cushioning abnormal downward movements of the wedge.

5. In a driving box wedge mechanism, the combination of an automatically adjustable wedge, and means for cushioning abnormal downward movements of the wedge comprising a spring support for said wedge.

6. In combination, a driving box wedge, a supporting member therefor, means bearing on said member for urging said wedge upwardly, and means for cushioning abnormal movements of the wedge downwardly.

7. In combination, a driving box wedge, a supporting member therefor, means bearing on said member for urging said wedge upwardly, and means for cushioning abnormal movements of the wedge downwardly comprising a spring support for said member.

8. In combination with a locomotive frame having a driving box positioned therein, an adjustable wear compensating wedge, a supporting member yieldingly secured to said frame, and means bearing on said member to advance said wedge to compensate for wear of said box and frame.

9. A driving box wedge mechanism comprising a wedge, a support therefor, spring means effective under normal downward thrusts for urging the wedge upwardly, and a second spring means for absorbing shocks to the support during abnormal or excessive downward thrusts.

In testimony whereof I have hereunto signed my name.

LLOYD N. HUTCHINSON.